United States Patent Office 2,954,114
Patented Sept. 27, 1960

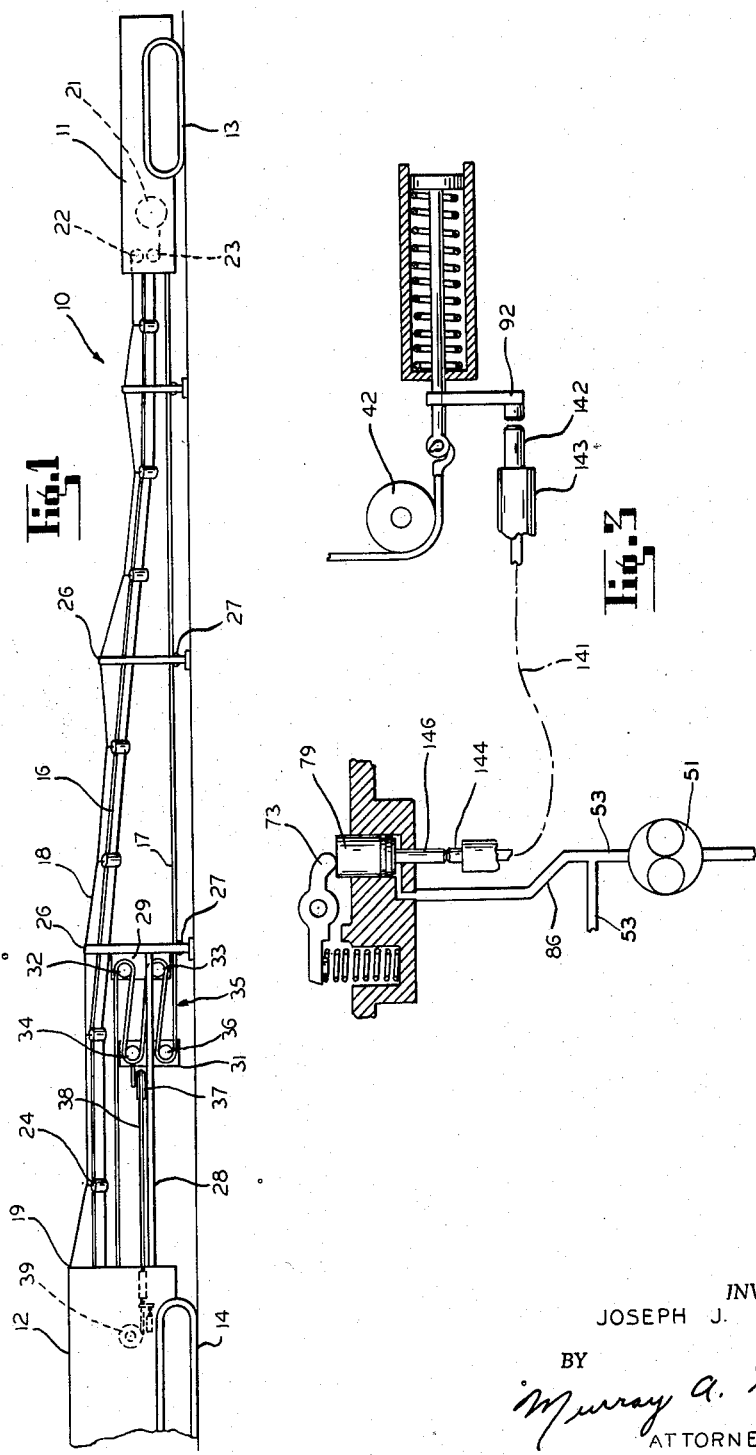

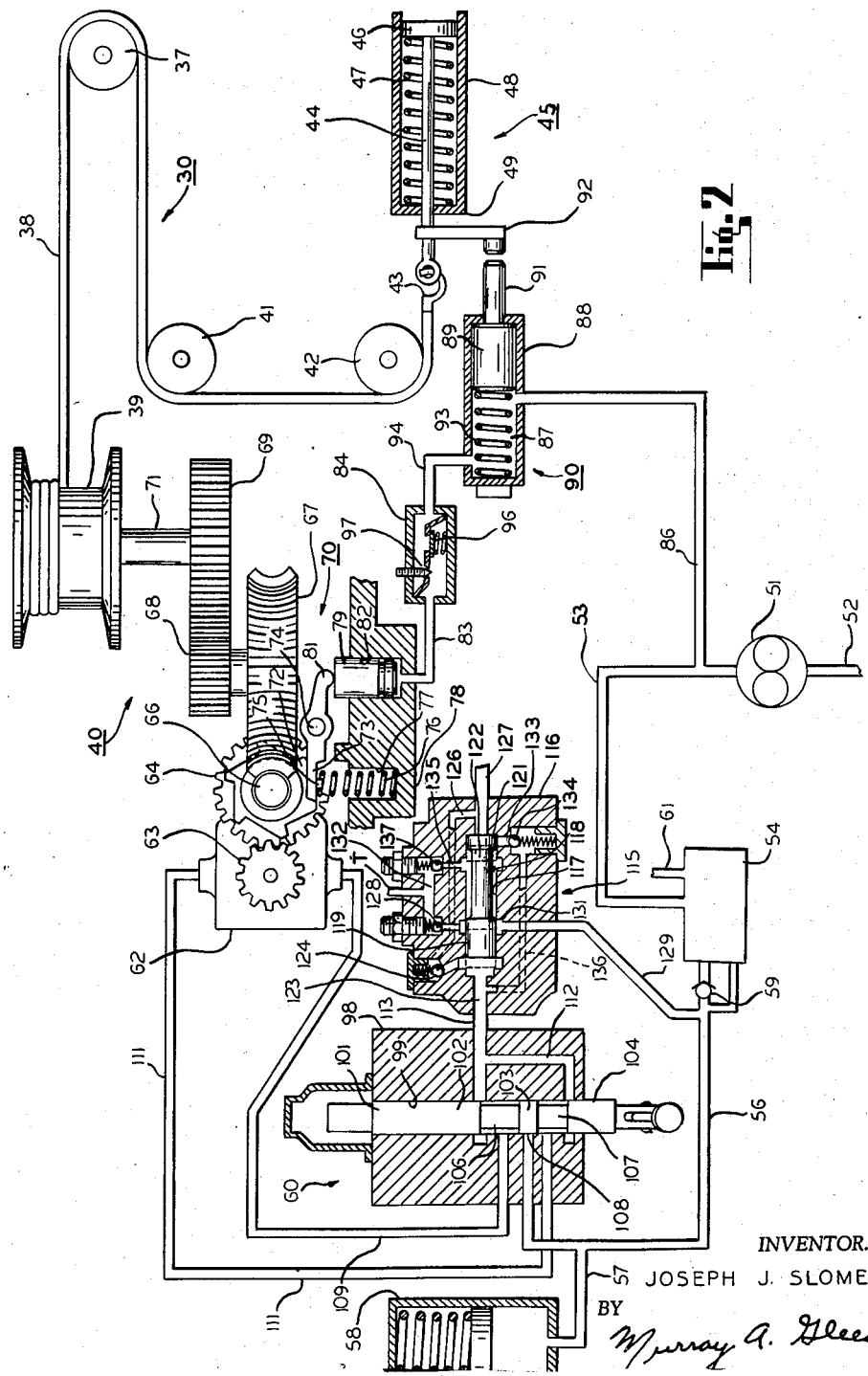

2,954,114

TENSION CONTROL APPARATUS FOR BELT STORAGE LOOP OF AN EXTENSIBLE BELT CONVEYOR

Joseph J. Slomer, Chicago, Ill., assignor to Goodman Manufacturing Company, Chicago, Ill., a corporation of Illinois Continuation of abandoned application Ser. No. 690,660, Oct. 17, 1957. This application Aug. 14, 1958, Ser. No. 755,052

12 Claims. (Cl. 198—208)

The invention relates generally to hydraulic devices for maintaining the proper tension on the belt storage loop of an extensible belt conveyor, and more particularly to apparatus whereby a tail section remote from the belt storage loop may be moved towards the working face by releasing an hydraulically operated cable winch for the storage loop.

This application is a continuation of my application Serial No. 690,660, filed October 17, 1957, now abandoned, for Tension Control Apparatus for Belt Storage Loop of an Extensible Conveyor now abandoned.

The invention herein is primarily useful in connection with the apparatus for maintaining the proper tension upon the belt storage loop disposed at the head or outby end of an extensible conveyor. For reasons of minimizing the power requirements it is eminently desirable to operate the pump supplying the fluid pressure system at a low unloading pressure when the head section has been placed in position. However, after the set up period it may be desirable to move the tail section a short distance toward the working face. Heretofore, such operations could be carried on only when the mechanism for maintaining tension on the belt loop was completely operative in both storage loop takeup and lengthening directions, and if for some reason the mechanism at the head section was inoperative, the tail section could not be readily moved for any distance without affecting the operation of the belt storage loop. For example, if the conveyor was lengthened by advancing the tail section under the conditions described, such advance would impose an inordinate amount of tension on the conveying belt. The invention herein makes it possible to move the tail section toward the working face without imposing too great a tension on the belt.

According to the structure disclosed herein it is possible after the set up period of the extensible conveyor to operate the pump supplying hydraulic fluid for winding up and maintaining tension upon the belt storage loop at a low unloading pressure, means being provided for enabling the belt storage loop to lengthen a short distance without operating the pump when the conveyor is shortened by retreat of the tail section, and conversely, to enable the belt storage loop to contract upon lengthening of the conveyor in accordance with the advance of the working face.

Structure according to the present invention makes it possible to maintain the conveyor in position with the belt storage loop properly tensioned although the hydraulic equipment at the head section for operating the belt storage is inoperative. Such hydraulic equipment includes locking means for the winch maintaining the proper tension on the storage loop. If the conveyor is lengthened by advancing the tail section such locking means is released so that the belt storage loops may shorten with the proper tension and such tension is maintained even though the pump and hydraulic circuit for the winch is inoperative.

With the foregoing considerations in mind it is a principal object of the invention to provide a novel hydraulic circuit and mechanism controlled thereby, whereby the pump supplying the hydraulic circuit for the belt storage loop can be unloaded at a low back pressure while at the same time permitting of lengthening and shortening of the belt storage loop as may be occasioned by change in length of the conveyor, together with locking means effective to lock the storage loop in position, such locking means being releasable when the hydraulic circuit is inoperative and when the conveyor is lengthened.

Another object is to provide locking means for the belt storage loops, such locking means being operable when the pump and hydraulic circuit for the belt loops is inoperable, as when the conveyor is not operated between working shifts.

Other objects and important features of the invention will be apparent from a study of the specification following, taken with the drawings, which together describe and illustrate some preferred embodiments of the invention and what are now considered to be the best modes of practicing the principles thereof. Other embodiments may be suggested to those having the benefit of the teachings herein, and such other embodiments are intended to be reserved especially as they fall within the scope and spirit of the subjoined claims.

In the drawings:

Fig. 1 is an elevational view of an extensible conveyor having the improved hydraulic circuit according to the present invention embodied therein;

Fig. 2 is a schematic view of an hydraulic circuit for maintaining the belt storage loop of the conveyor seen in Fig. 1 at the proper tension value, said circuit having the improvements according to the present invention embodied therein; and Fig. 3 is an alternate embodiment showing mechanical means for transmitting motion upon increase intension beyond a predetermined value of the belt storage loop to cause release of the takeup winch for such belt storage loop.

Referring now to Fig. 1 of the drawings, the improvements according to the present invention are embodied in an extensible conveyor indicated by the reference numeral 10 and having an inby or tail section 11 and an outby or head section 12, each being mounted respectively for movement upon crawler treads 13 and 14. A conveyor belt having a conveying reach 16 and a return reach 17 is trained for orbital movement between the end sections 11 and 12, driving means for the belt and means for reversing the reaches of the belt at the tail section 11 and the head section 12 not being shown since they are known in the art.

The conveyor shown is of the type where the conveying reach is supported upon laterally spaced flexible strands 18, one end thereof being anchored at 19 to the head section 12, and the other end being wound upon a winch 21 at the tail section 11, each strand being guided by idler sheaves 22 and 23 at the tail section 11. The load on the conveying reach 16 is transferred into the strands 18 by troughing roller assemblies 24, and the load on the strands 18 is transferred by means of standards 26 into the mine floor, each standard having a return idler 27 for guiding and supporting the return reach 17.

As seen in Fig. 1, the standard 26 inby of the head section 19 provides a support for a pair of spaced rails 28, the outby ends of which are supported at the head section 12. The spaced rails 28 afford a support for a fixed idler carriage 29 and a movable idler carriage 31, carriage 29 having idler sheaves 32 and 33, and movable idler carriage 31 having idler pulleys 34 and 36, the return reach of the belt 17 being reeved between the aforesaid idler pulleys to define a plurality of belt storage loops 35. The movable carriage 31 is part of a combined belt slack takeup and tensioning means 30 and includes an idler sheave 37 for training draft means, such as a belt tensioning cable 38, having one end wound upon a storage winch 39 forming part of power means 40 to move sheave 37 and pulleys 34 and 36 in a direction to enlarge belt storage loops 35. The cable 38 is trained around the idler sheave 37, and also around fixed idler sheaves 41 and 42 on the head section 12, see also Fig. 2, the other end of the cable 38 terminating in a hook 43 which is attached to a rod 44 having a movable flange 46 at one end thereof to provide a movable abutment for a coil spring 47. A cylindrical guide 48 for the rod 44, the flange 46 and spring 47 has a closed end 49 against which the other end of spring 47 is bottomed. Rod 44 and spring 47 form part of sensing means 45 of a force urging the pulleys 34 and 36, and carriage 31 in a direction to contract belt storage loops 35.

As see nin Fig. 2, the power means 40 are provided for winding the winch 39 in a direction so as to impose a proper degree of tension upon the conveying reach 16 and the return reach 17 by imposing a pull on the belt storage loops 35 reeved between the idler pulleys of the fixed idler carriage 29 and the movable idler carriage 31. Such power means 40 includes a pump 51 connected by a line 52 to a supply of hydraulic fluid. The output from the pump 51 is connected by a line 53 to an unloading valve 54 having a working pressure line 56 leading therefrom. A line 57 branches from pressure line 56 and is connected to an accumulator 58. A check valve 59 is connected in the working line 56 to prevent back flow from the accumulator 58 through valve 54 to tank.

The unloading valve 54 is arranged to bypass fluid to a tank line 61 when the pressure within the accumulator 58 reaches a predetermined upper pressure limit, the unloading valve 54 being of the type to impose substantially no back pressure against the pump 51 when it is moved to the unloading position.

A control valve indicated generally by the reference numeral 60 is arranged to control the flow of fluid to a fluid motor 62 to drive the winch 39 in directions to impose tension on the belt storage loop. The fluid motor 62 drives a pinion 63 meshing with a gear 64 fast with a worm 66. A worm wheel 67 meshes with the worm 66, and is fast with a pinion 68 in turn meshing with a gear 69 fast on a shaft 71 turning the winch drum 39.

Locking means 70 preventing unintended unwinding of the drum 39 includes a ratchet wheel 72 fast to the worm 66, and cooperating with a pawl 73 pivoted at 74. The pawl 73 is urged into contact with the ratchet wheel 72 by means of a spring 76 bottomed around a boss 75 on the pawl 73, the other end of the spring 76 being bottomed at the bottom of a recess 77 in an abutment 78.

During operation of the pump 51, whether it operates against low back pressure during unloading of the unloading valve 54, or whether it operates against a high back pressure when valve 54 is loading, the pawl 73 is urged out of engagement with the ratchet wheel 72 by means of a piston 79 engaging an arm 81 of the pawl 73. Piston 79 is slidable within a bore 82 formed in the abutment 78 and the bore 82 is connected by means of a line 83 to a valve body 84 communicating with the output of pump 51 by means of a pressure line 86 branching from the output line 53. Pressure line 86 is connected to a chamber 87 of a servo cylinder 88 having a piston 89 provided with an extension 91.

Under conditions as will appear, auxiliary means 90 is provided to release the pawl 73 when spring 47 is shortened by a contraction of belt storage loop 35, and such auxiliary means 90 includes an arm 92 carried by the rod 44 to make contact with the extension 91 and urge the piston 89 against the force of a light return spring 93.

A line 94 connects the chamber 87 to the valve body 84, and normally the pressure from the pump 51 is manifested past a check valve 96, so that the pressure is effective against the piston 79 to rock pawl 73 out of engagement with ratchet wheel 72. When the pump 51 no longer operates, the load in the spring 77 is normally effective to urge the piston 79 to the position shown in Fig. 2, the flow incident to the movement of the piston 79 moving past a throttling valve 97.

The control valve 60 includes a valve body 98 having a bore 99 therein with a spool valve plunger 101 slidable in valve bore 99. The spool valve member 101 is provided with spaced lands 102, 103 and 104, these lands being spaced by portions of reduced diameter 106 and 107. In the neutral position of the valve spool shown the land 103 blocks pressure line 56 connected to the valve body 98 at a port 108.

During set-up of the conveyor seen in Fig. 1, the valve spool 101 is moved to a winding position, where the land 103 unlaps the port 108 to cause communication of high pressure line 56 with a line 109 connected to the fluid motor 62. The exhaust fluid from the motor 62 moves by way of a line 111 to the valve 60 and past the reduced diameter portion 107 and to a passageway 112 within valve body 98 connected to a conduit 113.

A reverse flow valve indicated generally by the reference numeral 115 includes a valve body 116 having a bore 117 therein receiving a spool valve member 118 having a pair of opposed end lands 119 and 121 separated by a portion of reduced diameter 122. When motor 62 is operated as described to wind the cable 38 upon the winch drum 39 and thereby impose tension on the storage loop 35, the exhaust fluid from the motor 62 is effective in a passageway 123 in the valve body 116 and connected to conduit 113 to shift the spool valve member 118 to the right as shown.

Exhaust fluid from the motor 62 is ported to tank through reverse flow valve 115 past a check valve 124 in the valve body 116, the check valve 124 being disposed across a passageway 126 connected to a passageway 127 in turn connected to tank as shown.

The reverse flow valve 115 includes a high pressure relief valve 128 which is connected by means of a line 129 branching from the pressure line 56, line 129 being connected to an annular port 131 to which the relief valve 128 is connected, the discharge side of the valve 128 being connected by a passageway 132 in the valve body 116 to tank as shown.

Normally the setting of the high pressure relief valve 128 within the shuttle valve 115 may be of the order of 1,000 p.s.i., while the unloading valve 54 is set to load at a value of 775 p.s.i., and to unload at a value of 900 p.s.i. It will be seen, therefore, that the high pressure relief valve 128 is operable only when the unloading valve 54 fails to operate for some reason, and only when the control valve 60 is shifted to the winding position.

It may be noted that during the winding operation just described the output from the pump 51 is effective past the check valve 96 to move the piston 79 and the pawl 73 from the ratchet wheel 72 so that the motor 62 is freely released to drive winch drum 39.

The system thus far described is effective also to cause the reel 39 to turn in an unwinding direction, so that the tension on the storage loops 35 can be released, as may be indicated for the removal of a belt section from the conveyor 10.

Under such condition of operation the valve spool 101 is moved to the unwind position. This will cause the land 103 to lap the port 109, and cause pressure port 108 to communicate past the reduced diameter portion 107 with the line 111 to drive the motor 62 in the opposite or unwinding direction. At such time line 109 will become an exhaust line and the exhaust fluid will move past reduced diameter portion 106 to the exhaust passageway 113 causing the valve spool 118 to adopt the position as during the winding operation. It may be noted that the land 104 at such time blocks the passageway 112 so that the pressure fluid is diverted only into the line 111.

As before, with the winding operation, pawl 73 will release ratchet 72, the pressure from pump 51 being effective past servo valve cylinder 88 and valve 84 to move piston 79 and pawl 73. Since the pawl 73 is released, motor 62 can be driven in the reverse direction to release the tension on the belt storage loops.

As was described in the objects of this invention, it may be necessary to move the tail section 11 toward the head section 12 a limited distance or away from the head section 12 requiring the respective lengthening or shortening of the storage loops 35. Under such described operation, and when the pump 51 is either loading or unloading, the control valve 60 will be left in the wind position. As was previously stated, the pawl 73 is released by the pressure from pump 51.

Consider now the functions obtaining when the belt storage loop 35 must be shortened to enable the tail section 11 to advance without imposing too great a tension on the reaches 16 and 17 of the conveyor belt. When the storage loop 35 is shortened, motor 62 is driven as a pump in the reverse direction. At this time line 109 becomes the output line from the motor 62 while acting as a pump and line 111 becomes a supply line thereto. The output from motor 62 while acting as a pump moves past reduced diameter portion 106 and land 103, which now unlaps port 108. Land 102 laps passageway 113 at bore 99. Line 111 is now connected past reduced diameter portion 107 to line 112 and 113. Since the line 111 at such time will be at a suction pressure, it will shift the spool valve member 118 to the left thereby unlapping a port 133 therein. Fluid will be supplied to the motor 62 while acting as a pump from the tank line 127 past a check valve 134 connected to port 133, and by a line 136 connected to the passageway 123. At the same time the fluid pumped by motor 62 (now acting as a pump) will move from line 109 past the land 103 (which now unlaps the port 108), the pumped fluid moving by way of line 129 and past the port 131 and past the reduced diameter portion 122, the pumped fluid moving by a passageway 135 past a low pressure relief valve 137, it being connected across the passageway 132.

Accumulator 58 at this time is also being released of its pressure past low pressure relief valve 137.

By way of example, low pressure relief valve 137 may be set at the value of approximately 200 p.s.i. It will be seen, therefore, that the motor 62, acting as a pump operates against a lower back pressure thereby preventing the belt tension from reaching too high a value.

Consider now the condition obtaining when the tail section 11 is moved more than a limited distance toward the head section 12 which would require a lengthening of the belt storage loops 35 to prevent sag of both the conveying reach 16 and the return reach 17, all during which movement it is desirable to maintain the same tension upon the belt. The apparatus according to the present invention is effective to provide such lengthening of the belt storage loop 35 and to maintain the predetermined tension for a limited degree of movement of tail section 11 while the pump 51 is in either the unloading or loading operation.

The control valve 60 remains in the "wind" position as before, and the accumulator 58 and pump 51 are effective to supply pressure fluid past the land 103 and into the line 109 to drive the motor 62 in a winding direction, exhaust fluid from the motor being exhausted past the reduced diameter portion 107 of valve spool 101. Spent fluid is exhausted by way of the passageways 112 and line 113, valve spool 118 of shuttle valve 115 being shifted to the right, as during the original winding operation described. The exhaust fluid then moves past the check valve 124 and through line 126 as previously described to tank by line 127.

When the conveyor is no longer operating, as between working shifts, proper tension is maintained upon the belt storage loop. The stopping of pump 51 eventually results in the pressure in the system dropping to an ineffective working value. When pump 51 is inoperative, no pressure is manifested in lines 86 and 94, and the pawl 73 is moved to the locking position by the spring 76.

The belt storage loop 35 is thus held at its proper tension value, and as long as head and tail sections 12 and 11 are maintained in their relative positions, such tension will be maintained. If the tail section 11 is moved away from head section 12 excessive tension on the belt is prevented. The resultant shortening of the belt storage loops 35 causes the idler sheave 37 to move to the right thereby shortening spring 47 of auxiliary means 90 causing arm 92 to move piston 89 past the point where line 86 is connected to chamber 87. Continued movement of piston 89 by arm 92 causes a pulse of fluid to move past check valve 94 and raise piston 79 to release pawl 73.

Winch 39 is then free to pay off the cable 38, motor 62 operating as a pump against the back pressure of valve 137 of reverse flow valve 115. When spring 47 lengthens once more and pistons 89 returns under urgence of spring 93, the pawl is once more locked.

Referring now to Fig. 3 of the drawings, there is shown another arrangement whereby the pawl 73 can be moved to a position to release the ratchet 72. In this arrangement the pressure in the line 86 when the pump 51 is operating is directly effective against the piston 79. When pump 51 is inoperative, instead of the arm 92 providing a pulse of pressure fluid when the belt storage loops are over tensioned, it is effective to push a Bowden cable 141. Bowden cable 141 has an end member 142 slidable within a sheath for the cable 141, the other end of the cable having a solid member 144 effective against an extension 146 of the piston 79.

From the description foregoing it is believed evident that there has been provided a new and improved arrangement for controlling the tension of the conveyor belt of an extension conveyor.

The arrangement described makes unnecessary the continuous operation of the pump at a high loading pressure which would unduly heat the hydraulic fluid, and the apparatus is so constructed that the ordinarily experienced limited amounts of take-up and slackening off of the belt may be provided at all times while operating the pump at the head section only at the lower unloading pressure. The locking means is adapted to be released during idle periods of the pump when the storage loop is over-tensioned, so that the excess of tension can be released.

While the invention has been described in terms of some preferred embodiments thereof its scope is intended to be limited only by the claims here appended.

I claim as my invention:

1. In an extensible conveyor having a belt storage loop which may be lengthened and shortened in accordance with the length of said conveyor, said belt storage loop including at least one movable pulley having a portion of said belt storage loop reeved thereabout, the improvement in said conveyor for maintaining said belt storage loop at desired tension which comprises a pump connected to a source of motive fluid, belt slack take-up and tensioning means including a fluid-motor-operated-winch having draft means connected to said pulley for moving said pulley in a direction to lengthen and apply tension to said loop, means connecting said pump and said fluid-motor-operated-winch, locking means effective to lock said fluid-motor-operated-winch against movement in a direction to release the tension in said loop, fluid operated means for releasing said locking means, sensing means effective to sense a force on said pulley urging said pulley in a direction to contract said loop, said sensing means including a piston and cylinder, and means rendering the piston and cylinder effective to operate said fluid operated means when the tension in said storage loop increases beyond a predetermined amount.

2. The invention as defined in claim 1 wherein the fluid motor for said winch operates as a pump during release of tension on said belt storage loop, and wherein means are provided for reducing the back pressure on said fluid motor when so operating.

3. The invention as defined in claim 1 further characterized firstly, in that the locking means includes a ratchet and pawl and, secondly, that the fluid operated means includes a second piston and a second cylinder connected to the output of the pump, said second piston being effective to rock the pawl to a release position in response to a force of predetermined magnitude, as sensed by the sensing means, urging said pulley in a direction to contract the loop.

4. The invention as described in claim 1 further including means for actuating the fluid operated means in response to operation of the pump to thereby release the locking means.

5. In an extensible conveyor according to claim 1, means biasing said fluid operated means in a direction to lock said locking means, and a fluid connection between said pump and said fluid operated means enabling said pump when operating to release said locking means.

6. In an extensible conveyor having a belt storage loop which may be lengthened and shortened in accordance with the length of said conveyor, said belt storage loop including at least one movable pulley having a portion of said belt storage loop reeved thereabout, the improvement in said conveyor for maintaining said belt storage loop at desired tension which comprises a pump connected to a source of motive fluid, belt slack take-up and tensioning means including a fluid-motor-operated-winch having draft means connected to said pulley for moving said pulley in a direction to lengthen and apply tension to said loop, means connecting said pump and said fluid-motor-operated-winch, locking means effective to lock said fluid-motor-operated-winch against movement in a direction to release the tension in said loop, releasing means for releasing said locking means, sensing means having an element movable in accordance with variation of tension in said loop, said element being operatively connected to said releasing means to move the latter to release said locking means at a position of said element corresponding to a predetermined maximum tension in said loop.

7. In an extensible conveyor according to claim 6 wherein said releasing means includes fluid operated means for releasing said locking means and a fluid connection between said pump and fluid operated means effective to release said locking means in response to operation of said pump.

8. In an extensible conveyor having a belt storage loop which may be lengthened and shortened in accordance with the length of said conveyor, said belt storage loop including at least one movable member having a portion of said belt storage loop reeved thereabout, the improvement in said conveyor for maintaining said belt storage loop at desired tension which includes belt slack take-up and tensioning means, locking means effective to prevent release of the tension in said storage loop, releasing means for releasing said locking means, and sensing means effective to sense movement of said movable member in a direction to contract said storage loop, said sensing means including means for effectively operating said releasing means to release the locking means when the tension in the storage loop reaches a predetermined amount.

9. In an extensible conveyor having a belt storage loop which may be lengthened and shortened in accordance with the length of said conveyor, said belt storage loop including at least one movable member having a portion of said belt loop reeved thereabout, the improvement in said conveyor for maintaining said loop at desired tension which includes belt slack take-up and tensioning means effective to move the movable member in a direction to lengthen said loop and to apply tension thereto, locking means effective to lock said take-up and tensioning means so as to prevent release of the tension in said loop, releasing means for releasing said locking means, and sensing means having an element movable in response to variation of tension in said loop, said element being operably connected to said releasing means and effective to cause the releasing means to release said locking means at a position of said element that corresponds to a predetermined maximum tension in said loop.

10. A belt tension control system for use in an extensible belt conveyor of the type in which a belt is reeved about at least one movable pulley to form a belt storage loop which may be lengthened and shortened in accordance with the length of the conveyor, said system including, in combination, a winch and a cable reeved about the winch and operatively connected to the pulley to move the pulley back and forth to maintain a desired tension in the belt storage loop and consequently in the conveyor belt, power means for rotating the winch to reeve in cable, a ratchet and pawl locking mechanism operatively engaging the winch and effective to prevent unwinding movement of the winch, a spring biased to urge the pawl into locking engagement with the ratchet, a cylinder connected to a pump, a piston in the cylinder effective to urge the pawl out of engagement with the ratchet against the spring in response to a given pump pressure, a belt tension sensing member movable in response to an increase in tension in the belt storage loop operable to effectively urge the pawl out of engagement with the ratchet when a predetermined tension is reached in the belt storage loop, and a restoring spring biased to urge the belt tension sensing member out of effective engagement with the pawl.

11. The belt tension control system of claim 10 further including a force transmitting cable assembly disposed between the belt tension sensing member and the pawl, said cable assembly being effective to urge the pawl engaging piston against the pawl to thereby release the locking means when a predetermined tension, as sensed by the belt tension sensing member, is reached in the belt storage loop.

12. The belt tension control system of claim 10 further including an auxiliary cylinder in the line between the pump and first cylinder, said auxiliary cylinder having a piston with a portion engageable with the belt tension sensing member, said auxiliary piston being effective, when engaged by the belt tension sensing member, to urge a shot of pressure fluid against the first piston to thereby disengage the pawl from the ratchet.

References Cited in the file of this patent

UNITED STATES PATENTS 2,788,116    Wood _____ Apr. 9, 1957